United States Patent
Mizuno et al.

(10) Patent No.: US 9,815,546 B2
(45) Date of Patent: Nov. 14, 2017

(54) METHOD FOR REPAIRING HONEYCOMB CORE SANDWICH STRUCTURAL BODY AND REPAIRED PRODUCT

(71) Applicant: MITSUBISHI AIRCRAFT CORPORATION, Aichi (JP)

(72) Inventors: Kotoyo Mizuno, Tokyo (JP); Toshikazu Shigetomi, Tokyo (JP); Hideaki Tanaka, Tokyo (JP); Morimasa Ishida, Aichi (JP); Shuhei Muto, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 486 days.

(21) Appl. No.: 14/221,595

(22) Filed: Mar. 21, 2014

(65) Prior Publication Data
US 2014/0295123 A1 Oct. 2, 2014

(30) Foreign Application Priority Data
Mar. 28, 2013 (JP) ................. 2013-069371

(51) Int. Cl.
*B29C 73/00* (2006.01)
*B32B 43/00* (2006.01)
(Continued)

(52) U.S. Cl.
CPC ............... *B64C 3/26* (2013.01); *B29C 73/06* (2013.01); *B64C 1/12* (2013.01); *B64F 5/40* (2017.01);
(Continued)

(58) Field of Classification Search
CPC ......... B29C 73/04; B29C 73/06; B29C 73/10; B29C 65/4835; B29C 65/524;
(Continued)

(56) References Cited

U.S. PATENT DOCUMENTS 4,284,443 A * 8/1981 Hilton .................. B31D 3/0207
156/182
6,149,749 A * 11/2000 McBroom ............... B29C 73/02
156/87
(Continued)

FOREIGN PATENT DOCUMENTS

JP 08169057 A * 7/1996 ....... B29C 66/81461

OTHER PUBLICATIONS

ARP5089 "Composite Repair NDT/NDI Handbook", SAE International, Nov. 1, 1996, p. 87.

Primary Examiner — Philip Tucker
Assistant Examiner — Brian R Slawski
(74) *Attorney, Agent, or Firm* — Pearne & Gordon LLP

(57) ABSTRACT

A method for repairing a honeycomb core sandwich structural body according to the present invention is a method in which a damaged portion that is formed in a honeycomb core sandwich structural body where a honeycomb structured core is held between a first outer skin and a second outer skin and that reaches the core through the first outer skin is repaired, the method including: a repair material mounting step of mounting a repair material on the damaged portion, the repair material including a patch that covers an opening of the damaged portion, and one or a plurality of braces that support the patch; a patch bonding step of bonding the patch to the first outer skin; and a brace bonding step of bonding the brace to the second outer skin or the core.

13 Claims, 6 Drawing Sheets

(51) Int. Cl.
- *B29C 65/00* (2006.01)
- *B32B 37/00* (2006.01)
- *H05K 13/04* (2006.01)
- *C09J 5/00* (2006.01)
- *B32B 3/26* (2006.01)
- *B32B 3/00* (2006.01)
- *B32B 3/12* (2006.01)
- *B64C 3/26* (2006.01)
- *B64C 1/12* (2006.01)
- *B29C 73/06* (2006.01)
- *B64F 5/40* (2017.01)
- *B29C 73/10* (2006.01)
- *B32B 37/12* (2006.01)
- *B29C 65/52* (2006.01)
- *B29C 65/54* (2006.01)
- *B29L 31/60* (2006.01)

(52) U.S. Cl.
CPC .......... *B29C 65/524* (2013.01); *B29C 65/542* (2013.01); *B29C 73/10* (2013.01); *B29L 2031/608* (2013.01); *B32B 3/12* (2013.01); *B32B 43/00* (2013.01); *B32B 2037/1253* (2013.01); *Y10T 428/20* (2015.01)

(58) Field of Classification Search
CPC ............. B29C 65/542; B29C 66/00224; B29L 2031/60; B29L 2031/601; B29L 2031/602; B29L 2031/608; Y10T 428/24149; Y10T 428/24165; Y10T 428/20; Y10T 156/1082; B64F 5/0081; B32B 3/12; B32B 43/00; B32B 2037/1253; B64C 1/12; B64C 3/26
USPC ..... 156/60, 94, 98, 153, 250, 252, 256, 258, 156/268, 290, 291, 292, 293, 295, 296, 156/297, 303.1, 305; 428/63, 68, 72, 73, 428/116, 118
See application file for complete search history.

(56) References Cited

U.S. PATENT DOCUMENTS

2004/0207106 A1* 10/2004 Reis ................ B29C 73/06 264/36.11
2007/0289692 A1* 12/2007 Bogue .................... B29C 73/06 156/98
2009/0269547 A1* 10/2009 Meyer ................ B29C 44/1228 428/116

* cited by examiner

METHOD FOR REPAIRING HONEYCOMB CORE SANDWICH STRUCTURAL BODY AND REPAIRED PRODUCT

BACKGROUND OF THE INVENTION

Field of the Invention

The present invention relates to a method for repairing a honeycomb core sandwich structural body, and a repaired product obtained by repairing the honeycomb core sandwich structural body.

Description of the Related Art

A lightweight and highly-rigid honeycomb core sandwich panel is used as an outer panel (skin) forming an outer surface of a fuselage or a wing of an aircraft. The honeycomb core sandwich panel is configured by sandwiching a honeycomb structured core with a plurality of cells having a hexagonal cross section are formed between a pair of outer skins.

In the honeycomb core sandwich panel used as the outer panel, a damaged portion may be formed reaching the core through the outer skin by a lightning strike or a flying object such as hail.

As a repair method employed when the damaged portion reaches the core, a repair space is formed by removing a position where the damaged portion is formed in the outer skin and the core, and the periphery thereof, and a honeycomb structured plug is inserted into the repair space and used as a substitute for the damaged core portion as described in, for example, ARP5089 COMPOSITE REPAIR NDT/NDI HANDBOOK, p. 87. The repair space is covered with a patch from above the plug, and the patch is bonded to the outer skin.

A pre-cured patch obtained by impregnating a fiber base material with thermosetting resin, and preliminarily curing the obtained object before repair can be used as the patch.

In accordance with the repair method according to ARP5089 COMPOSITE REPAIR NDT/NDI HANDBOOK, p. 87, the core is repaired by mounting the honeycomb structured plug, and the pre-cured patch as a substitute for the outer skin is supported by the plug. Thus, high rigidity equivalent to that before the panel is damaged is obtained.

However, it takes time to fabricate the honeycomb structured plug as a substitute for the core. A time required for the repair is thereby extended.

The panel may be repaired by using only the pre-cured patch without repairing the core. In this case, the pre-cured patch is not supported by the core. Thus, the rigidity is deteriorated as compared to that before the panel is damaged.

In view of the above problems, an object of the present invention is to quickly repair the honeycomb core sandwich panel while ensuring the rigidity of the honeycomb core sandwich panel.

SUMMARY OF THE INVENTION

To achieve the above object, a method for repairing a honeycomb core sandwich structural body according to the present invention is a method in which a damaged portion that is formed in a honeycomb core sandwich structural body where a honeycomb structured core is held between a first outer skin and a second outer skin and that reaches the core through the first outer skin is repaired, the method including: a repair material mounting step of mounting a repair material on the damaged portion, the repair material including a patch that covers an opening of the damaged portion, and one or a plurality of braces that support the patch; a patch bonding step of bonding the patch to the first outer skin; and a brace bonding step of bonding the brace to the second outer skin or the core.

In the repair method according to the present invention, by using the repair material where the patch is supported by the brace, out-of-plane rigidity required for the patch can be ensured. The rigidity of the entire honeycomb core sandwich structural body can be also ensured. Therefore, even when the core is not repaired, repair is completed only by mounting the repair material on the damaged portion, and bonding the patch and the brace respectively to the first outer skin and the second outer skin. Thus, the honeycomb core sandwich structural body can be quickly repaired.

Since the out-of-plane rigidity of the patch can be ensured by the brace, the patch can be made thin. Accordingly, the patch can be bent in an out-of-plane direction, so that the patch can be applied to the first outer skin even when the first outer skin is curved.

In the method according to the present invention, a thermosetting adhesive may be used in both the patch bonding step and the brace bonding step, and the patch bonding step and the brace bonding step may be performed at the same time by transferring heat emitted from a heat source used for bonding the patch to the first outer skin to the second outer skin side through the brace.

By transferring the heat emitted from the heat source used for bonding the patch to the first outer skin to the second outer skin side through the brace, the patch and the first outer skin, and the brace and the second outer skin can be thermally cured by using the same heat source.

In the method according to the present invention, a thermoplastic adhesive may be used in both the patch bonding step and the brace bonding step, and the patch bonding step and the brace bonding step may be performed at the same time by transferring heat emitted from a heat source used for bonding the patch to the first outer skin to the second outer skin side through the brace.

By transferring the heat emitted from the heat source used for bonding the patch to the first outer skin to the second outer skin side through the brace, the patch and the first outer skin, and the brace and the second outer skin can be heated and melted by using the same heat source, and thereafter solidified.

In the method according to the present invention, the brace may have a pipe shape, and include an axially-continuous path, a through hole may be formed in the patch so as to open the path, and an adhesive for bonding the brace to the second outer skin or the core may be injected into the path from the through hole.

Since the brace is already arranged close to the second outer skin or the core as an object to be bonded, the repair operation can be smoothly performed without curing the adhesive by injecting the adhesive into the path from the through hole.

In the method according to the present invention, the brace may have a pipe shape, and include an axially-continuous path, and the adhesive for bonding the brace to the second outer skin may be injected from a distal end side of the path.

By injecting the adhesive from the distal end side of the path, it becomes unnecessary to inject the adhesive into the path from the through hole. Accordingly, the brace can be bonded to the second outer skin without the necessity to close the through hole.

In the method according to the present invention, when the brace includes the axially-continuous path, the path may be gradually widened on a distal end side where the brace is bonded to the second outer skin or the core.

Since the path of the brace is gradually widened on the distal end side, the adhesive within the path is spread to the periphery of the brace. The distal end of the brace can be thereby rigidly bonded to the second outer skin. Since a bonded area between an end surface of the distal end of the brace and the second outer skin becomes larger, the brace can be also rigidly bonded to the second outer skin.

In the method according to the present invention, the brace may include a plurality of braces, and any of the braces selected optionally from the plurality of braces may intersect the other braces.

A pseudo structure of the core can be achieved by the plurality of braces having an intersecting structure and the patch. Therefore, the rigidity of the honeycomb core sandwich structural body can be more sufficiently ensured.

A repaired product according to the present invention is obtained by repairing a damaged portion that is formed in a honeycomb core sandwich structural body where a honeycomb structured core is held between a first outer skin and a second outer skin and that reaches the core through the first outer skin, the repaired product including a repair material including a patch that covers an opening of the damaged portion, and one or a plurality of braces that support the patch, wherein the patch is bonded to the first outer skin, and the brace is bonded to the second outer skin or the core.

An outer panel of an aircraft according to the present invention includes a honeycomb core sandwich structural body where a honeycomb structured core is held between a first outer skin and a second outer skin. The outer panel includes a repair material including a patch that covers an opening of a damaged portion that is formed in the outer panel and that reaches the core through the first outer skin, and one or a plurality of braces that support the patch, wherein the patch is bonded to the first outer skin, and the brace is bonded to the second outer skin or the core.

Moreover, an aircraft of the present invention includes the aforementioned outer panel.

By applying the repair material including the patch and the brace that supports the patch to the damaged portion, the above inventions related to the repaired product, the outer panel, and the aircraft can produce actions and effects similar to those described above.

In accordance with the present invention, the repair method for bonding the patch whose out-of-plane rigidity is required to the repair target while reducing an operation time for repairing the repair target portion can be provided.

DETAILED DESCRIPTION OF THE PREFERRED EMBODIMENTS

In the following, the present invention is described in detail based on embodiments shown in the accompanying drawings.

First Embodiment

The configuration of a honeycomb core sandwich panel obtained by repair is described first, and a method for repairing the honeycomb core sandwich panel is subsequently described.

Figure 1:
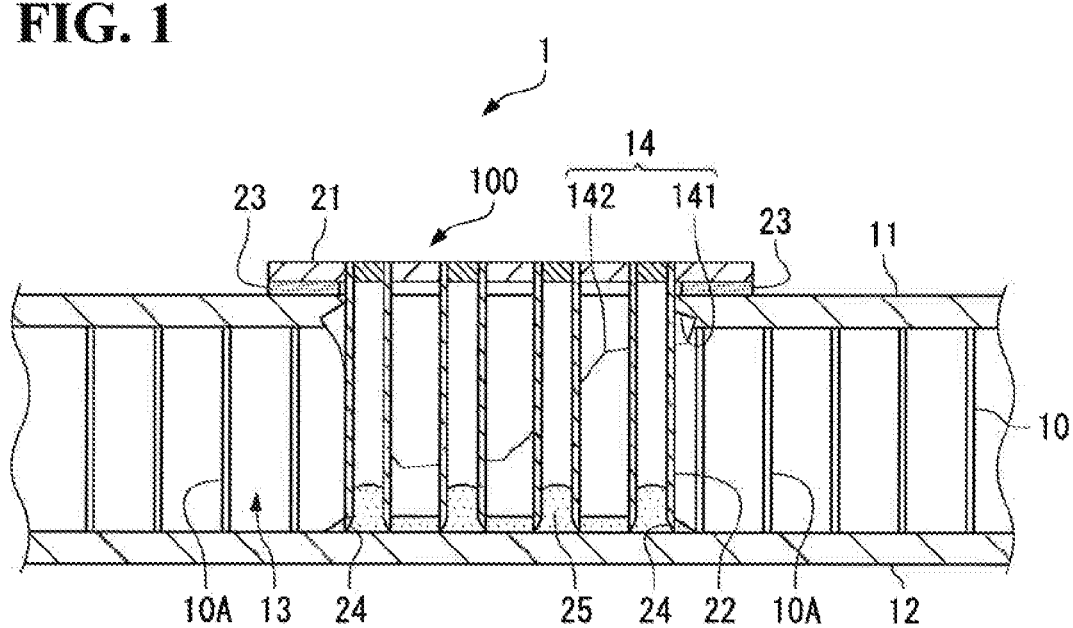
FIG. 1 is a sectional view schematically illustrating a honeycomb core sandwich panel after repair according to a first embodiment.

A honeycomb core sandwich panel 1 shown in FIG. 1 forms an outer panel that constitutes an outer surface of a wing or a fuselage of an aircraft. The outer panel is respectively arranged on the upper and lower sides of the wing with a space therebetween, and assembled in a box-like shape together with spars that form a leading edge and a trailing edge of the wing.

The honeycomb core sandwich panel 1 (referred to as panel 1 below) includes a honeycomb structured core 10 that is an aggregate of cells 13, and a pair of outer skins 11 and 12 that are attached to end surfaces of the core 10. The panel 1 may also include a layer other than the core 10 and the outer skins 11 and 12.

The core 10 includes partition walls 10A that partition the core 10 into a plurality of cells 13 each having a hexagonal cross section. The core 10 is lightweight, and has high bending rigidity and shear rigidity due to the structure in which the cells 13 are tightly arranged in an in-plane direction. The core 10 is made of fiber-reinforced resin, metal, or resin.

The outer skins 11 and 12 are bonded to the end surfaces of the core 10, and thereby integrated with the core 10. The outer skins 11 and 12 are also made of fiber-reinforced resin, metal, or resin. Since the outer skins 11 and 12 are supported by the core 10 with high rigidity, the outer skins 11 and 12 can be formed thin.

By combining the core 10 with the outer skins 11 and 12, each honeycomb core sandwich panel 1 as a whole achieves high bending rigidity and shear rigidity.

The panel 1 may be damaged upon receiving an impact by a lightning strike, hail or the like, and a damaged portion 14 may be formed penetrating the outer skin 11 to reach the core 10. FIG. 1 shows the panel 1 in a state where the damaged portion 14 is repaired by using a repair material 100. The damaged portion 14 includes a damaged skin portion 141 that penetrates the outer skin 11 in a thickness direction, and a damaged core portion 142 that communicates with the damaged skin portion 141.

Here, the damaged portion 14 denotes the insides of the damaged skin portion 141 and the damaged core portion 142, and a predetermined range including the surrounding of the damaged skin portion 141 and the damaged core portion 142.

The outer skin 11 around the damaged skin portion 141 is preferably formed into a surface appropriate for bonding to a patch 21 through sanding and cleaning.

The repair material 100 includes the plate-like patch 21 that covers the damaged skin portion 141, and a plurality of braces 22 that support the patch 21 from a rear surface.

The patch 21 is bonded to the outer skin 11 around the damaged skin portion 141 to thereby close the damaged skin portion 141. The patch 21 is required to have out-of-plane rigidity so as not to bulge in an out-of-plane direction by resisting deformation or buckling even when a large load is applied during cruising.

The patch 21 is bonded to the outer skin 11 by an adhesive layer 23 that is made of thermosetting resin. The adhesive layer 23 is heated via the patch 21 and thereby cured as described below.

The patch 21 is made of fiber reinforced resin. Carbon fiber, glass fiber or the like may be used as reinforcement fiber that constitutes the fiber reinforced resin. Thermosetting resin such as epoxy resin and polyimide resin may be used as resin. Reinforcement fiber and resin (including thermoplastic resin) other than those described above may be also used. The patch 21 is a pre-cured patch that is preliminarily cured before repair.

The patch 21 may be also made of metal.

Figure 2A:
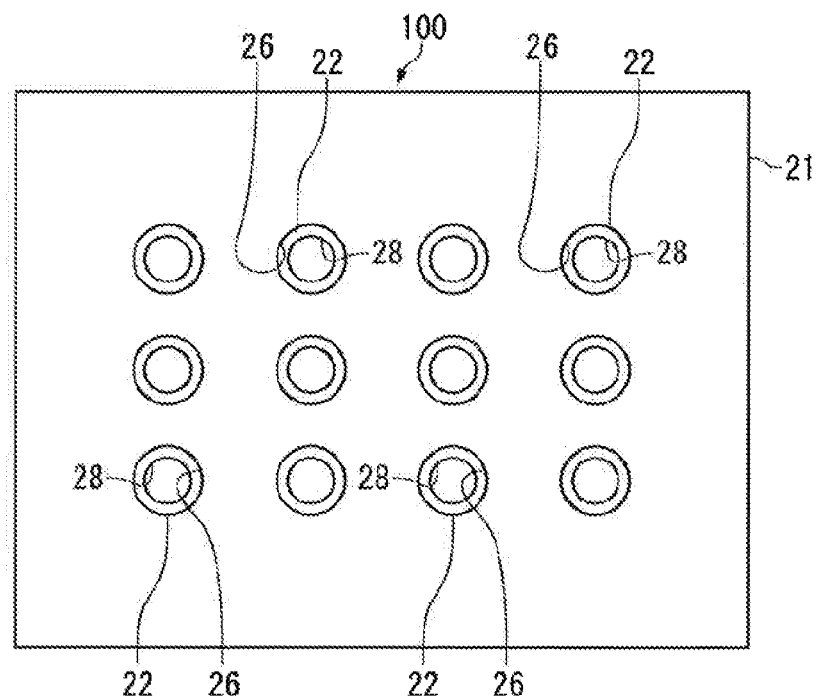
FIG. 2A is a plan view illustrating a repair material.
Figure 2B:
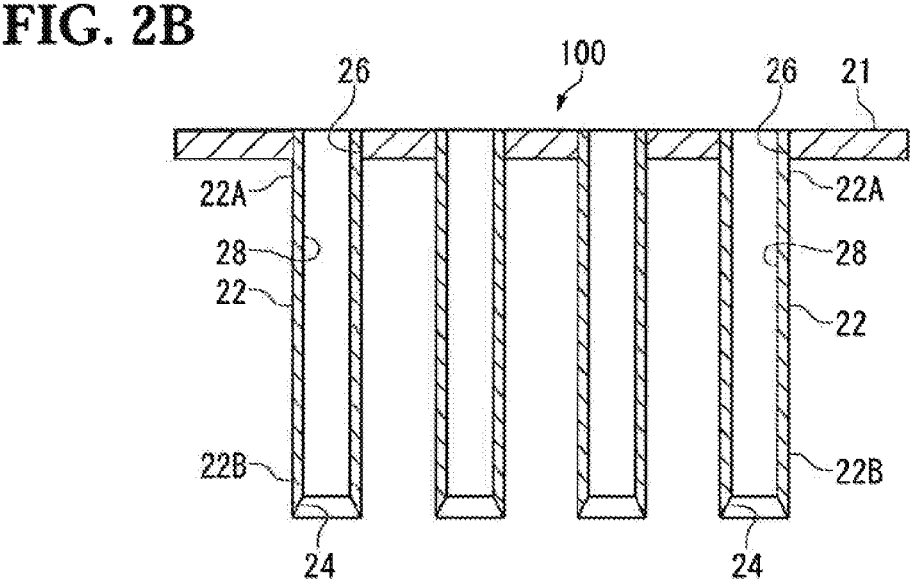
FIG. 2B is a sectional view of the repair material.

As shown in FIGS. 1 and 2A,2B, a plurality of through holes 26 are formed penetrating the patch 21 in a thickness direction. A proximal end 22A of each of the braces 22 is inserted into each of the through holes 26.

Although the patch 21 has a rectangular planar shape as shown in FIGS. 2A,2B, the patch 21 may be formed in any shape such as a circular or oval shape.

Each of the braces 22 is formed in a hollow cylindrical shape, and has an axially-continuous path 28 therein. That is, the brace 22 is a pipe. The brace 22 is erected substantially perpendicular to the rear surface of the patch 21.

The brace 22 is preliminarily joined to the patch 21 by using, for example, an adhesive with the proximal end 22A inserted into the through hole 26 of the patch 21. An end surface of the proximal end 22A of the brace 22 is flush with the surface of the patch 21. The proximal end 22A of the path 28 is opened via the through hole 26.

A distal end 22B of the brace 22 is bonded to the outer skin 12 by an adhesive portion 25 that is made of thermosetting resin in a state in abutment with the outer skin 12.

The path 28 inside the brace 22 functions as an injection path for injecting an adhesive forming the adhesive portion 25 toward the distal end 22B of the brace 22.

The brace 22 transfers heat applied from the side of the outer skin 11 to cure the adhesive layer 23 to the side of the outer skin 12 so as to cure the adhesive for bonding the distal end 22B to the outer skin 12.

To efficiently transfer the heat, the brace 22 is preferably made of a material with good heat conductivity. Therefore, in the present embodiment, lightweight aluminum alloy having good heat conductivity is used as the material of the brace 22.

The path 28 of the brace 22 is widened on the side of the distal end 22B. Accordingly, a tapered portion 24 is formed on an inner peripheral surface of the brace 22 in which the path 28 is formed. Since the tapered portion 24 is formed, the thickness of the brace 22 becomes gradually smaller toward the distal end 22B.

Figure 4A:
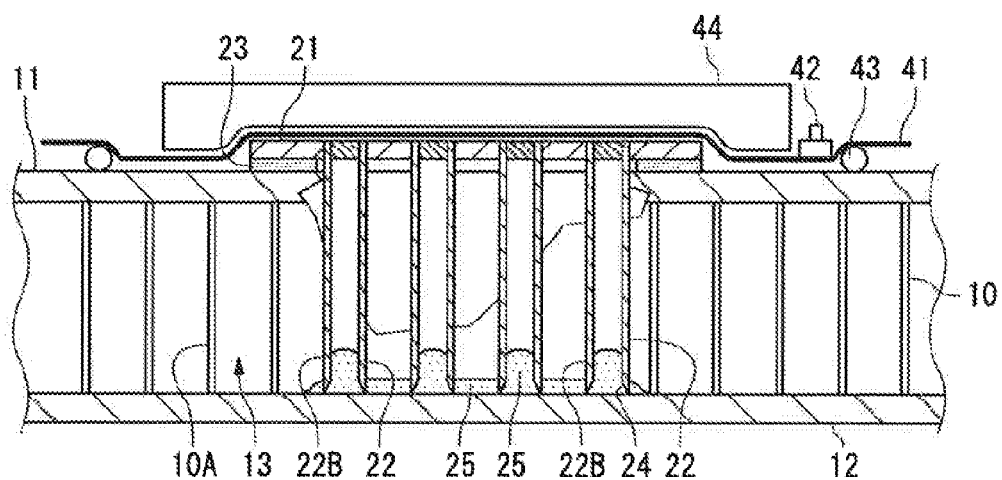
FIGS. 4A and 4B are views illustrating a repair procedure in the first embodiment.
Figure 4B:
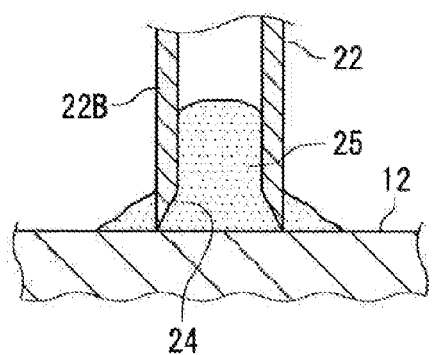

The adhesive in the path 28 is spread to the periphery of the brace 22 by the tapered portion 24. The adhesive portion 25 is thereby formed so as to surround the brace 22 from both the inner periphery and the outer periphery as shown in FIG. 4B. The distal end 22B of the brace 22 is thereby rigidly bonded to the outer skin 12. Since a bonded area becomes larger by forming the tapered portion 24, the brace 22 is rigidly bonded to the outer skin 12.

To increase the bonded area between the brace 22 and the outer skin 12, a form different from the tapered shape may be employed by forming an end surface of the distal end 22B in, for example, a wave-like shape.

The out-of-plane rigidity required for the patch 21 is ensured since the patch 21 is supported by the braces 22 bonded to the outer skin 12 as described above. Accordingly, the rigidity of the entire honeycomb core sandwich panel 1 is also ensured.

Instead of the core 10, the braces 22 supporting the patch 21 are inserted into the damaged core portion 142.

The braces 22 are also inserted into the core 10 when the core 10 remains on the side of the outer skin 12.

In the present embodiment, the distal ends 22B of the braces 22 contact the outer skin 12 in abutment therewith, and the distal ends 22B are bonded to the outer skin 12. If the robust core 10 enough to provide the rigidity is left on the side of the outer skin 12, the distal ends 22B may be bonded to the portion of the robust core 10. In this case, there may be a gap between the distal ends 22B and the outer skin 12. The plurality of braces 22 may be bonded to the outer skin 12 or the robust core 10. The braces 22 may have different lengths from each other.

The braces 22 may be set to any diameter, number, and arrangement according to the support strength of the braces 22 required for ensuring the out-of-plane rigidity of the patch 21 and the rigidity of the panel 1.

When the braces 22 are inserted into the damaged core portion 142, there may be a brace that ruptures the partition walls 10A or that is inserted into the cell 13 among the braces 22.

The braces 22 may be attached to the patch 21 in any method. For example, the braces 22 may be attached to the patch 21 by joining nuts to the peripheral rims of the through holes 26 of the patch 21, forming threaded grooves in outer peripheral portions of the proximal ends 22A of the braces 22, and fixing the braces 22 to the nuts with screw fixation.

In the following, the method for repairing the honeycomb core sandwich panel 1 is described by reference to FIGS. 3A,3B and 4A,4B.

Figure 3A:
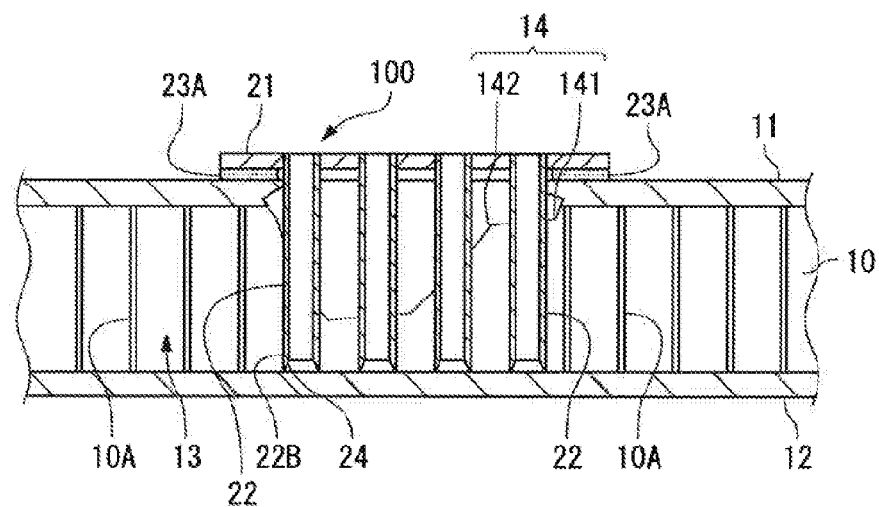
FIGS. 3A and 3B are views illustrating a repair procedure in the first embodiment.

First, as shown in FIG. 3A, the repair material 100 is disposed on the damaged portion 14 (a repair material mounting step).

When the braces 22 of the repair material 100 are inserted into the damaged core portion 142, the braces 22 can be easily inserted into the core 10 since the distal ends 22B of the braces 22 are sharp by forming the tapered portions 24. When the braces 22 are abutted against the outer skin 12, the patch 21 is arranged on the outer skin 11.

An adhesive 23A made of thermosetting resin in a sheet-like shape is arranged on the outer skin 11 in advance, and interposed between the patch 21 and the outer skin 11. The adhesive 23A may be formed in a shape similar to that of the patch 21 as shown in the drawing, or in an annular shape along the periphery of the damaged skin portion 141.

Figure 3B:
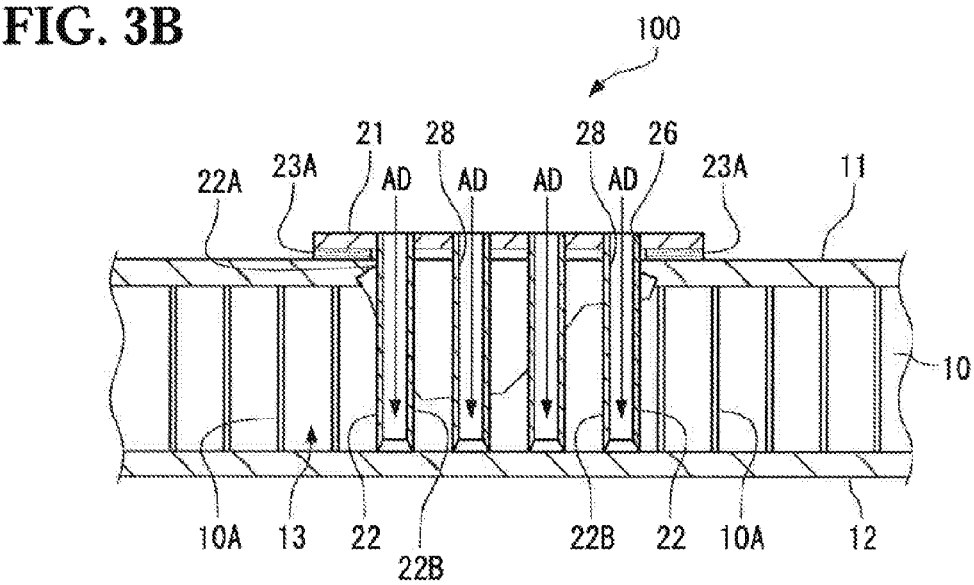

Subsequently, an adhesive AD made of thermosetting resin is injected into the paths 28 of the braces 22 from the through holes 26 of the patch 21 as shown in FIG. 3B (an adhesive injecting step).

The amount of the adhesive AD to be injected is determined according to the viscosity of the adhesive AD so as to reliably bond the braces 22 to the outer skin 12 at the distal ends 22B of the braces 22.

After injecting the adhesive AD, the through holes 26 of the patch 21 are closed with a seal material or the like.

The adhesive AD may be also injected through an injection tube that is inserted into the paths 28 of the braces 22. By using an injection tube having a length to reach the distal ends 22B of the braces 22, the adhesive AD can be supplied in a required amount to a required position.

Subsequently, the patch 21 and the outer skin 11 around the patch 21 are covered with a heat-resistive film 41. A gap between the film 41 and the outer skin 11 is sealed by a sealant tape 43. Vacuum drawing is then performed (a vacuum drawing step). It is preferable to continuously perform the vacuum drawing in subsequent patch bonding and brace bonding steps.

When the vacuum drawing is performed through a valve 42 provided in the film 41, a sealed space inside the film 41 is decompressed. The patch 21 is pressed against the outer skin 11 due to a difference between a pressure inside the decompressed sealed space and an atmospheric pressure. The patch 21 can be thereby uniformly brought into close contact with the outer skin 11 via the adhesive 23A.

Subsequently, the patch 21 is bonded to the outer skin 11, and the braces 22 are bonded to the outer skin 12 by curing the adhesive 23A and the adhesive AD (patch bonding and brace bonding steps).

A heater mat 44 that incorporates a heater, a heat gun or the like may be used as a heat source for curing the adhesive 23A and the adhesive AD.

Here, the heater mat 44 is overlaid on the repair material 100 from above the film 41 to heat the repair material 100. The adhesive 23A is heated via the patch 21 to be cured. The adhesive 23A thereby forms the adhesive layer 23. Meanwhile, the adhesive AD is heated via the patch 21 and the braces 22 to be cured. The adhesive AD thereby forms the adhesive portions 25.

Curing of the adhesive 23A and curing of the adhesive AD proceed at the same time by heat emitted from the heater mat 44 and are respectively completed.

The patch 21 is thereby fixed to the outer skin 11, and the distal ends 22B of the braces 22 are thereby fixed to the outer skin 12. The proximal ends 22A of the braces 22 are fixed to the patch 21, and the distal ends 22B are fixed to the outer skin 12, so that the braces 22 reliably support the patch 21.

The repair of the honeycomb core sandwich panel 1 is thereby completed.

Effects of the present embodiment described above are described.

In accordance with the repair method in the present embodiment, the out-of-plane rigidity required for the patch 21 can be ensured, and the rigidity of the entire panel 1 can be also ensured by using the repair material 100 in which the patch 21 is supported by the braces 22. Therefore, even when the core 10 is not repaired, the repair is completed only by mounting the repair material 100 on the damaged portion 14, and bonding the patch 21 and the braces 22 respectively to the outer skins 11 and 12. Thus, the panel 1 can be quickly repaired.

Since the out-of-plane rigidity of the patch 21 is ensured by supporting the patch 21 by the braces 22, the patch 21 itself may be thin. When the patch 21 is thin, the patch 21 can be bent in the out-of-plane direction. Thus, even when the surface of the outer skin 11 is curved, the patch 21 can be brought into close contact with the outer skin 11 by following the curved surface.

When the patch 21 has high followability to the curved outer skin 11 as described above, it is enough to prepare the general-purpose patch 21 for any shape without preparing a patch having a shape matching the shape of the outer skin 11. Thus, the cost required for the repair can be suppressed. Since a residual stress after bonding can be also reduced, the patch 21 is not likely to be separated from the outer skin 11 after the repair.

Moreover, in accordance with the repair method in the present embodiment, the heat applied to the patch 21 so as to cure the adhesive 23A for bonding the patch 21 to the outer skin 11 is guided to the adhesive AD at the distal ends 22B of the braces 22 through the braces 22. Therefore, the adhesive 23A and the adhesive AD can be cured by the same heat source (the heater mat 44). Thus, it is not necessary to heat the adhesive AD from the side of the outer skin 12 so as to cure the adhesive AD.

When the panel 1 is assembled in a box-like shape together with spars, it is sometimes difficult to access the side of the outer skin 12 located inside the box. In this case, it is particularly effective to use the heat transfer of the braces 22.

In the present embodiment, the adhesive AD is supplied into the paths 28 of the braces 22 after the repair material 100 is mounted on the panel 1. In this case, since the braces 22 are already arranged close to the outer skin 12 or the core 10 as an object to be bonded, the repair operation can be smoothly performed without curing the adhesive.

Figure 5:
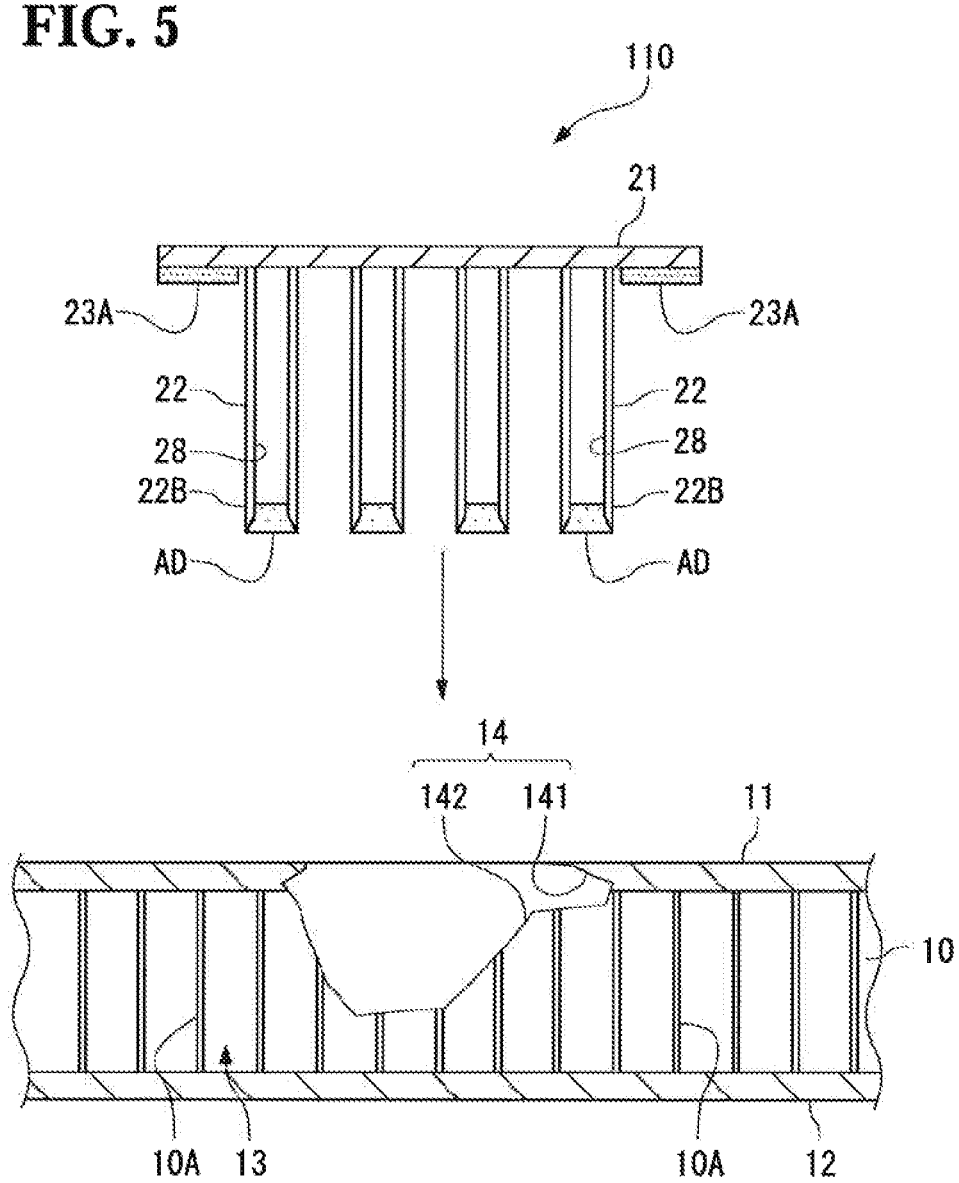
FIG. 5 is a view illustrating a modification of the first embodiment.

The adhesive AD may be provided in the braces 22 before mounting a repair material 110 on the damaged portion 14 of the panel 1 as shown in FIG. 5. In this case, the adhesive AD can be provided in the paths 28 of the braces 22 from the side of the distal ends 22B. Thus, it is not necessary to form the through holes 26 in the patch 21.

When the adhesive AD is injected into the paths 28 of the braces 22, the repair material 110 is positioned such that the sides of the distal ends 22B are directed upward, if necessary.

The repair material 110 is then mounted on the damaged portion 14. The adhesive 23A and the adhesive AD are cured by using an appropriate heat source.

In accordance with the example shown in FIG. 5, the patch 21 where the through holes 26 are not formed can be used. It is thus not necessary to close the through holes 26.

As long as the adhesive AD can be retained at the distal ends 22B of the braces 22, it is not necessary to form the paths 28 in the braces 22. Solid braces may be also used. In this case, recess portions capable of accommodating the adhesive are preferably formed at the distal ends of the braces.

An adhesive made of thermoplastic resin such as nylon, polyethylene, polystyrene, and polyvinyl chloride may be also used as the adhesive 23A and the adhesive AD. In this case, by transferring the heat emitted from the heat source used for bonding the patch 21 to the outer skin 11 to the side of the outer skin 12 through the braces 22, the patch bonding step and the brace bonding step are performed at the same time.

Second Embodiment

Figure 6A:
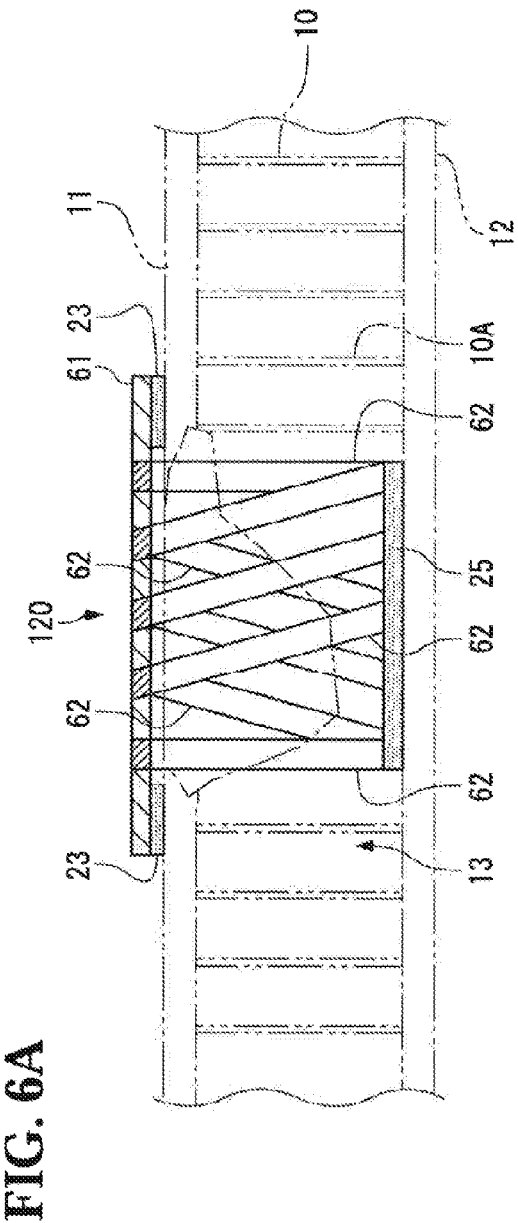
FIGS. 6A and 6B are views illustrating a second embodiment.

Next, a second embodiment is described by reference to FIGS. 6A and 6B.

Although the braces 22 are provided substantially perpendicular to the outer skins 11 and 12 in the first embodiment, the braces may be also inclined with respect to the outer skins as in the second embodiment.

A repair material 120 in the second embodiment includes the patch 21, and a plurality of braces 62 attached obliquely with respect to the patch 21.

Figure 6B:
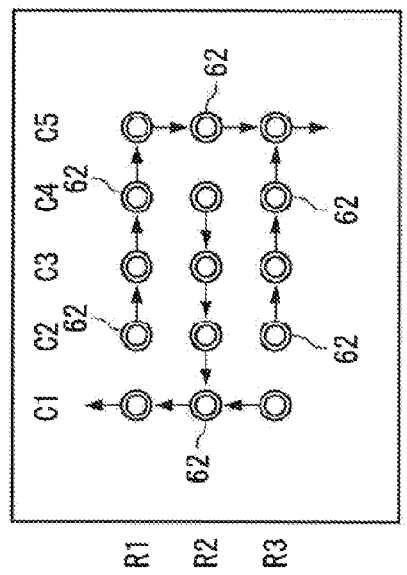

Each of the braces 62 is inclined in the direction of an arrow shown in FIG. 6B. The arrow indicates a direction to shift the distal end 22B with respect to the proximal end 22A of the brace 62.

Here, as an example, the braces 62 are arranged in five columns in a shorter direction of the patch 21. Three braces 62 are arranged in one column.

The braces 62 in a first column C1 are inclined along the shorter direction. The braces 62 in a fifth column C5 are inclined in an opposite direction from the braces 62 in the first column C1 along the shorter direction.

The braces 62 from a second column C2 to a fourth column C4 are inclined along a longer direction. Among the braces 62, the braces 62 in a first row R1 and a third row R3 are inclined to the right side in the drawing, and the braces 62 in a second row R2 are inclined to the left side.

The inclined angles of the braces 62 may be equal to or different from each other. The inclination of the braces 62 may be oriented regularly as described above or irregularly.

As described above, any of the braces 62 selected optionally from the plurality of braces 62 intersects the other braces 62. Accordingly, even when a shear stress is applied in a thickness direction of the panel 1, the panel 1 has a high resisting force against the shear stress. Consequently, the panel 1 repaired by using the repair material 120 has higher shear rigidity than that of the panel 1 in the first embodiment that uses the same number of braces 22. The repair material 120 has shear rigidity and bending rigidity equivalent to those of the robust core 10.

In accordance with the present embodiment, a pseudo structure of the core 10 can be achieved by the braces 62 having an intersecting structure and the patch 21. Therefore, the rigidity of the panel 1 can be more sufficiently ensured.

The directions of the braces 62 described above are merely one example. It is preferable to incline the plurality of braces 62 in a balanced manner so as to evenly exert the shear rigidity.

Although the present invention has been described based on the preferable embodiments, the constitutions described in the aforementioned embodiment may be also freely selected or changed into other constitutions without departing from the gist of the present invention.

For example, the adhesive used in the present invention is not limited to the thermosetting adhesive. For example, an ultraviolet curable adhesive or the like may be also used.

The present invention is not limited to the outer panel of the aircraft, but may be also applied to repair a wall material, a floor material, a ceiling material, a door or the like provided in the aircraft. The present invention may be also applied to repair other structural objects or accessories of the aircraft.

Furthermore, the present invention may be applied to repair all objects to be repaired in a field other than the aircraft, e.g., a wind turbine blade. The present invention may be applied to repair various objects damaged by impact, high temperature, abrasion, erosion or the like.

What is claimed is:

1. A method for repairing a honeycomb core sandwich structural body, in which a damaged portion that is formed in a honeycomb core sandwich structural body where a honeycomb structured core is held between a first outer skin and a second outer skin and that reaches the core through the first outer skin is repaired, the method comprising:
   joining one or a plurality of braces to a patch to form a repair material wherein the one or the plurality of braces directly support the patch, have a pipe shape and include an axially-continuous path;
   a repair material mounting step of mounting the repair material on the damaged portion, wherein the patch covers an opening of the damaged portion;
   a patch bonding step of bonding the patch to the first outer skin; and
   a brace bonding step of bonding the brace to the second outer skin or the core wherein an adhesive for bonding the brace to the second outer skin or the core is injected from a distal end side of the axially-continuous path.

2. The method according to claim 1,
   wherein a thermosetting adhesive is used in both the patch bonding step and the brace bonding step, and
   the patch bonding step and the brace bonding step are performed at the same time by transferring heat emitted from a heat source used for bonding the patch to the first outer skin to the second outer skin side through the brace.

3. The method according to claim 1,
   wherein a thermoplastic adhesive is used in both the patch bonding step and the brace bonding step, and
   the patch bonding step and the brace bonding step are performed at the same time by transferring heat emitted from a heat source used for bonding the patch to the first outer skin to the second outer skin side through the brace.

4. The method according to claim 1,
   wherein
   at least two of the plurality of braces intersect each other.

5. The method according to claim 1, wherein an end of each of the braces directly contacts the patch.

6. The method according to claim 1, wherein the patch is made of fiber reinforced resin.

7. The method according to claim 1, wherein the patch is a pre-cured patch.

8. The method according to claim 1, wherein the patch is made of metal.

9. The method according to claim 1, wherein the brace is made of aluminum alloy.

10. The method according to claim 1, wherein in the brace bonding step, the brace is bonded to the second outer skin.

11. A method for repairing a honeycomb core sandwich structural body, in which a damaged portion that is formed in a honeycomb core sandwich structural body where a honeycomb structured core is held between a first outer skin and a second outer skin and that reaches the core through the first outer skin is repaired, the method comprising:
   a repair material mounting step of mounting a repair material on the damaged portion, the repair material including a patch that covers an opening of the damaged portion, and one or a plurality of braces that support the patch;
   a patch bonding step of bonding the patch to the first outer skin; and
   a brace bonding step of bonding the brace to the second outer skin or the core,
   wherein the brace has a pipe shape, and includes an axially-continuous path,
   a through hole is formed in the patch so as to open the path, and
   an adhesive for bonding the brace to the second outer skin or the core is injected into the path from the through hole.

12. The method according to claim 11,
   wherein the path is gradually widened on a distal end side where the brace is bonded to the second outer skin or the core.

13. A method for repairing a honeycomb core sandwich structural body, in which a damaged portion that is formed in a honeycomb core sandwich structural body where a honeycomb structured core is held between a first outer skin and a second outer skin and that reaches the core through the first outer skin is repaired, the method comprising:

a repair material mounting step of mounting a repair material on the damaged portion, the repair material including a patch that covers an opening of the damaged portion, and one or a plurality of braces that directly support the patch;

a patch bonding step of bonding the patch to the first outer skin; and a brace bonding step of bonding the brace to the second outer skin or the core, wherein the one or the plurality of braces are pipe-shaped and include an axially-continuous path and wherein an adhesive for bonding the brace to the second outer skin or the core is injected from a distal end side of the axially-continuous path.

\* \* \* \* \*